United States Patent [19]
Hara et al.

[11] Patent Number: 5,751,130
[45] Date of Patent: May 12, 1998

[54] TIME CONSTANT SETTING METHOD FOR A TRACK PROGRAM OF A ROBOT

[75] Inventors: Ryuichi Hara, Fujiyoshida; Atsuo Nagayama, Oshino-mura, both of Japan

[73] Assignee: Fanuc, Ltd., Yamanashi, Japan

[21] Appl. No.: 669,469
[22] PCT Filed: Nov. 7, 1995
[86] PCT No.: PCT/JP95/02276
§ 371 Date: Jul. 8, 1996
§ 102(e) Date: Jul. 8, 1996
[87] PCT Pub. No.: WO96/15480
PCT Pub. Date: May 23, 1996

[30] Foreign Application Priority Data

Nov. 9, 1994 [JP] Japan ............ 6-299108

[51] Int. Cl.$^6$ ........................ G05B 19/18
[52] U.S. Cl. ........................ 318/575; 318/568.2
[58] Field of Search ........... 318/568.19, 568.2, 318/568.21, 575, 568.17, 568.18

[56] References Cited

U.S. PATENT DOCUMENTS 5,004,968  4/1991  Mizuno et al. ............ 318/615
5,325,467  6/1994  Torii et al. ............ 395/96

FOREIGN PATENT DOCUMENTS 0 484 551 A1  5/1992  European Pat. Off. .
0 538 483 A1  4/1993  European Pat. Off. .

OTHER PUBLICATIONS

English language Patent Abstract & JP 4-306711, filed Oct. 29, 1992, Ietoshi ITOU.

*Primary Examiner*—Bentsu Ro
*Attorney, Agent, or Firm*—Staas & Halsey

[57] ABSTRACT

A method for determining time constants for acceleration and deceleration of a servomotor to be set in preparing a track program for an industrial robot. In setting the time constants, they are calculated in consideration of torques generated due to interference with other axes, which is caused as a plurality of axes are actuated simultaneously when the robot moves on desired tracks. As a result, the torques will not be saturated despite influences, if any, of interference torques, so that there is no possibility of tracks being deflected, and cycle times can be shortened by assigning relatively short time constants in the case where the influences of the interference torques are not substantial.

4 Claims, 3 Drawing Sheets

TIME CONSTANT SETTING METHOD FOR A TRACK PROGRAM OF A ROBOT

TECHNICAL FIELD

The present invention relates to a method for determining time constant for acceleration and decelerations of a servomotor for driving the axes of an industrial robot, which are to be determined when a track program is performed for the robot.

BACKGROUND ART

In preparing a modern track program for an industrial robot (hereinafter referred to simply as "robot"), a commonly employed system is designed so that a definite time constant is set with every motion, and servomotors (hereinafter referred to simply as "motors") for driving the axes of the robot are made to be accelerated and decelerated smoothly with a filter of the time constant applied. In setting the time constant, the concept of maximum acceleration control is usually applied in order to shorten cycle times of robot operation.

In the conventional maximum acceleration control, the maximum acceleration is determined by separately calculating moments and inertias that act on the motors of the individual axes at various points of time during the operation, and, based on the result of the calculation, time constants are set so that the servomotors can generate their respective maximum torques.

In general, however, a robot moves on a target track as a plurality of axes thereof are actuated simultaneously, so that torques (interference torques) attributable to the motions of other axes act on each axis of the robot. According to the conventional method, however, even though the time constants are set so that the motors of the individual axes can generate their maximum torques on calculation, the torques may possibly be saturated on account of the interference torques, or on the contrary, the robot sometimes may be actuated with a small torque generated therein.

If the torques are saturated, the accuracy of the robot track worsens. If the robot is operated with a small working torque, then it implies that the cycle times are not satisfactorily shortened by making the robot operate to its capacity. Thus, according to the conventional method for the robot track programming, problems are inevitable because the time constants are not settled in consideration of interference torque components.

DISCLOSURE OF THE INVENTION

The object of the present invention is to improve the track accuracy and to shorten the cycle time of a robot by setting, in consideration of the interference torques attributable to the motions of other axes, the time constants for acceleration and deceleration, which are to be determined when programming for the track of a robot having a plurality of axes to be driven individually by servomotors.

In order to achieve the above object, according to an aspect of the present invention, there is provided a time constant setting method for a track program for a robot having a plurality of axes driven individually by servomotors, comprising steps of:

obtaining time constants for acceleration and deceleration control for at least two axes out of said plurality of axes, which are shortest as far as torques generated will not saturate, at the start point and end point of a motion section where the speed of each axis at the start point and end point can be regarded as zero, taking into consideration the effects of interference torques exerted between said at least two axes, by online software processings of a robot controller which controls said robot; and setting the time constants obtained for said axes in the robot controller which controls said robot.

According to another aspect of the present invention, there is provided a time constant setting method for a track program for a robot having a plurality of axes driven individually by servomotors, comprising steps of:

obtaining time constants for acceleration and deceleration control for at least two axes out of said plurality of axes, which are shortest as far as torques generated will not saturate, at the start point and end point of a motion section where the speed of each axis at the start point and end point can be regarded as zero, taking into consideration the effects of interference torques exerted between said at least two axes, by online software processings of a robot controller which controls said robot; and setting the longest time constant out of time constants obtained for said axes in the robot controller which controls said robot.

Preferably, the software processing includes a processing for obtaining time constant conditions in which restrictive condition for enabling the individual axes to actualize a target track and restrictive conditions based on the maximum torque of the robot are simultaneously satisfied under conditions based on evaluation of the influences of interference torques determined according to kinetic equations for the robot.

According to the present invention, both the saturation of torques generated by motor, which is attributable to the setting of too short time constants in the track program, and inadequate exertion of performance, which is attributable to the setting of too long time constants, can be restrained. Thus, the accuracy of the robot track can be improved, and the cycle times can be shortened.

BEST MODE OF CARRYING OUT THE INVENTION

First, the principle of time constant setting according to the present invention will be described.

The present invention is intended to set time constants, in consideration of interference torques from other axes, but based on the conventional concept of maximum acceleration control. In other words, according to the present invention, the time constants in consideration of the interference torques, are determined according to the following three conditions for a track program.

(1) Kinetic equations for the robot: The interference torques to be considered are reflected on the contents of determination of the time constant under this condition.

(2) Restrictive conditional expression for each axis for actualizing target track: A condition dependent on the target track and structural parameters of the robot, and more specifically, described by a Jacobian matrix that defines the relation in transformation between space coordinates (X Y Z) and axial space coordinates (θ1 θ2 ... θN) for each axis (see embodiment mentioned later).

(3) Restrictive condition based on maximum torque of robot: A condition for the performance of a motor.

Of these three conditions, (2) and (3) are those conditions that are naturally used in time constant computation for conventional maximum acceleration control. However, the present invention is the first attempt to incorporate the kinetic equations for the robot, including descriptions of the kinetic conditions of the other axes, into the conditions for time constant computation, in order to take the interference torques into consideration.

Since the interference torques are values that are determined depending on the kinetic states of the other axes, they vary every moment in accordance with the motion of the robot, to be exact. The influences of the interference torques become the most serious problem in the vicinity of the starting and end points of a motion section for acceleration and deceleration control, mainly due to acceleration (provided that speeds at the start and end points are zero or so small that its contribution to the interference torques is negligible).

According to the present invention, in order to execute a processing for determining the time constant under the aforesaid three conditions for the track program and in an on-line mode with the processing load restricted within a reasonable range, computation of the interference torques is executed for the two points, starting and end points, of the motion section, in consideration of only the interference torques generated by the accelerations of other axes.

According to the present invention, the time constant is set in consideration of the interference torques, when a track programing is performed for the robot, so that those phenomena such as the saturation of motor-generated torques or inadequate performance can be restrained, and improvement of the accuracy of the robot track and shortening of cycle times can be realized.

Figure 1:
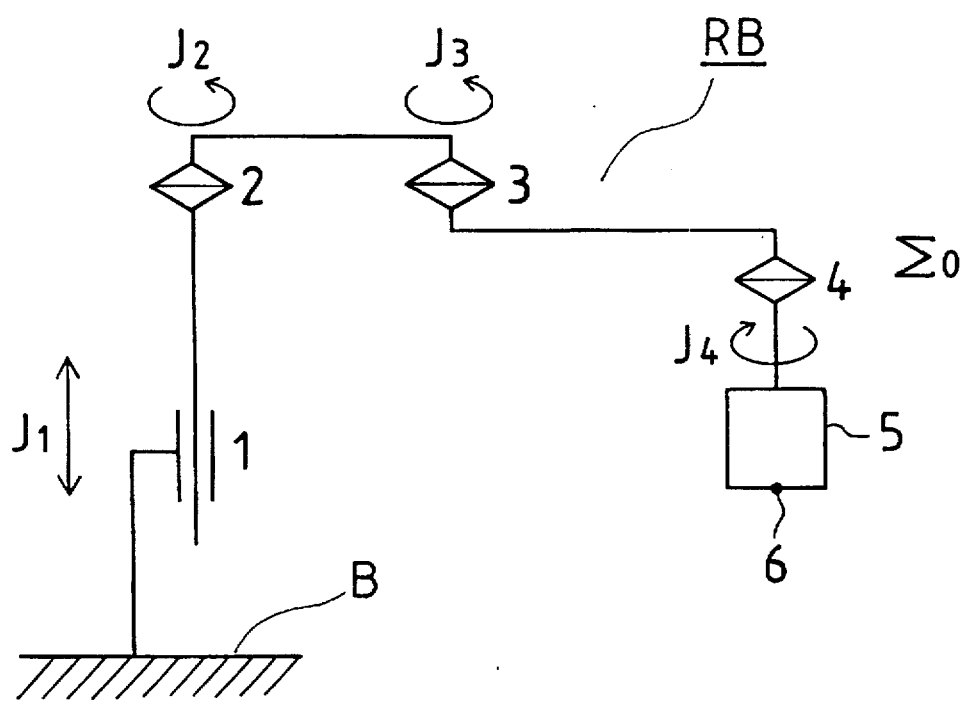
FIG. 1 is a diagram showing an arrangement of axes of a four-axis horizontal multi-joint robot to which a method of the present invention is applied.

The following is a description of a time constant setting method according to the present invention applied to a four-axis horizontal multi-joint robot, such as the one shown in FIG. 1.

The four-axis horizontal multi-joint robot, which is generally designated by symbol RB in FIG. 1, has first to fourth axes, namely axes 1 to 4, arranged in succession from the side of a base B. The first axis 1 is a vertically linear axis, while the second and third axes are pivotal axes for driving links which operate individually within horizontal planes. The fourth axis 4 is for rotating an end effector 5 in the hand of the robot within a horizontal plane. Numeral 6 denotes a tool center point that is set in the distal end position of the end effector 5. Axis variables (illustrated angles for the second and third axes) are designated J1 to J4. Σ0 designates a three-dimensional cartesian coordinate system in which the robot RB operates.

In general, the axes of rotation near the base B are liable to exert the influences of their interference torques upon each other. According to the present embodiment, in making the track program for the robot arranged in this manner, the time constant is expected to be determined in consideration of the interference torques of the second and third axes 2 and 3.

The following is detailed descriptions of the aforementioned conditions (1) to (3).

(1) Kinetic equations for robot:

Kinetic equations for the second and third axes are generally given by the following equations [1] and [2].

$$T2 = I2*\ddot{J}2 - C2*(\ddot{J}2+\ddot{J}3) + f(\dot{J}2, \dot{J}3, J2, J3), \quad [1]$$

$$T3 = I3*\ddot{J}3 - C3*(\ddot{J}2+\ddot{J}3) + g(\dot{J}2, \dot{J}3, J2, J3), \quad [2]$$

Here the symbols represent the following items (i=2 or 3).

Ti: Torque generated by an i'th axis.

Ii: Inertia of the i'th axis.

Ci: Coefficient of the interference torque of the i'th axis.

f( ): Term based on the speed of the second axis.

g( ): Term based on the speed of the third axis.

Ji: Angle value of the i'th axis (see FIG. 1).

Each symbol with one dot on its top represents the first-degree differential of time, while each symbol with two dots represents the second-degree differential of time.

Regarding the speed terms as negligible at the starting and end points, the following equations [3] and [4] are used.

$$T2 = I2*\ddot{J}2 - C2*(\ddot{J}2+\ddot{J}3), \quad [3]$$

$$T3 = I3*\ddot{J}3 - C3*(\ddot{J}2+\ddot{J}3), \quad [4]$$

(2) Restrictive conditional expression for each axis for actualizing target track:

If the position of a tool center point of the robot and the position of the j-th axis on the three-dimensional cartesian coordinate system Σ0 (hereinafter referred to simply as "cartesian coordinate system") for the operation of the robot are given by p and j respectively, p is a function of j. This relation is given by equation [5], and equation [6] is obtained by differentiating equation [5] with time.

$$p = f(j), \quad [5]$$

$$\dot{p} = J(j)*\dot{j}, \quad [6]$$

where J(j) is a Jacobian matrix that defines the relation of p and j. Specific contents are calculated in accordance with the structural parameters of the robot.

Further differentiating equation [6] with time, we obtain the following equation [7].

$$\ddot{p} = \dot{J}(j)*\dot{j} + J(j)*\ddot{j}. \quad [7]$$

If the time differential of J in equation [7] is given by $\dot{J}=0$, in consideration of the starting or end point of operation, equation [8] is obtained.

$$\ddot{p} = J(j)*\ddot{j}. \quad [8]$$

From equation [8], moreover, equation [9] is obtained as a restrictive conditional expression for each axis, which is used to actualize the target track.

$$\ddot{j} = J(j)^{-1}*\ddot{p}. \quad [9]$$

(3) Restrictive condition based on maximum torque of robot:

Let it be supposed that the torque generated by the i'th axis and the maximum torque are Ti and Tmax-i respectively, and that there are conditions for the second and third axes, which are given by the following equations [10] and [11]. Here the maximum torque includes no static load torques (Tw2, Tw3).

$T2 < Tmax-2$, [10]

$T3 < Tmax-3$, [11]

Rearranging these conditional expressions, we obtain the following equations [12] to [16].

$$T2 = I2 * \ddot{J}2 - C2*(\dot{J}2+\dot{J}3),$$ [12]

$$T3 = I3 * \ddot{J}3 - C3*(\dot{J}2+\dot{J}3),$$ [13]

$$\ddot{j} = J(j)^{-1} * \ddot{p},$$ [14]

$$T2 < Tmax-2,$$ [15]

$$T3 < Tmax-3,$$ [16]

Here equation [14] is expressed as follows:

$$\ddot{J}2 = A2 * Acc,$$ [14A]

$$\ddot{J}3 = A3 * Acc,$$ [14B]

where symbol Acc is the acceleration of the target track, and Ai is a coefficient for the acceleration of the target track.

From equations [12], [14A] and [15], we obtain the following equation [17].

$$T2 = \{I2*A2 - C2*(A2+A3)\}*Acc \leq Tmax-2.$$ [17]

Transforming equation [17], we obtain equation [18].

$$Acc \leq Tmax-2/\{I2*A2-C2*(A2+A3)\}.$$ [18]

On the other hand, from equations [13], [14B] and [16], we obtain the following equation [19].

$$T3 = \{I3*A3 - C3*(A2+A3)\}*Acc \leq Tmax-3.$$ [19]

Transforming equation [19], moreover, we obtain equation [20].

$$Acc \leq Tmax-3/\{I3*A3-C3*(A2+A3)\}.$$ [20]

After all, accelerations in consideration of the interference torques can be determined for the second and third axes by obtaining the maximum Acc satisfying equations [18] and [20] and then obtaining accelerations for J2 and J3 from the maximum Acc according to the aforesaid equations [14A] and [14B]. Time constants τ to be obtained are adjusted to the time constants for the second and third axes by calculating speeds Vt2 and Vt3 of J2 and J3, corresponding to taught speeds in the motion section concerned, and then obtaining τ2 and τ3 according to the following equations [21] and [22]. For a high-accuracy trajectory, τ2 or τ3, whichever is not smaller, may be set as a time constant common to the second and third axes.

$$\tau 2 = Vt2/(A2*Acc),$$ [21]

$$\tau 3 = Vt3/(A3*Acc),$$ [22]

Figure 2:
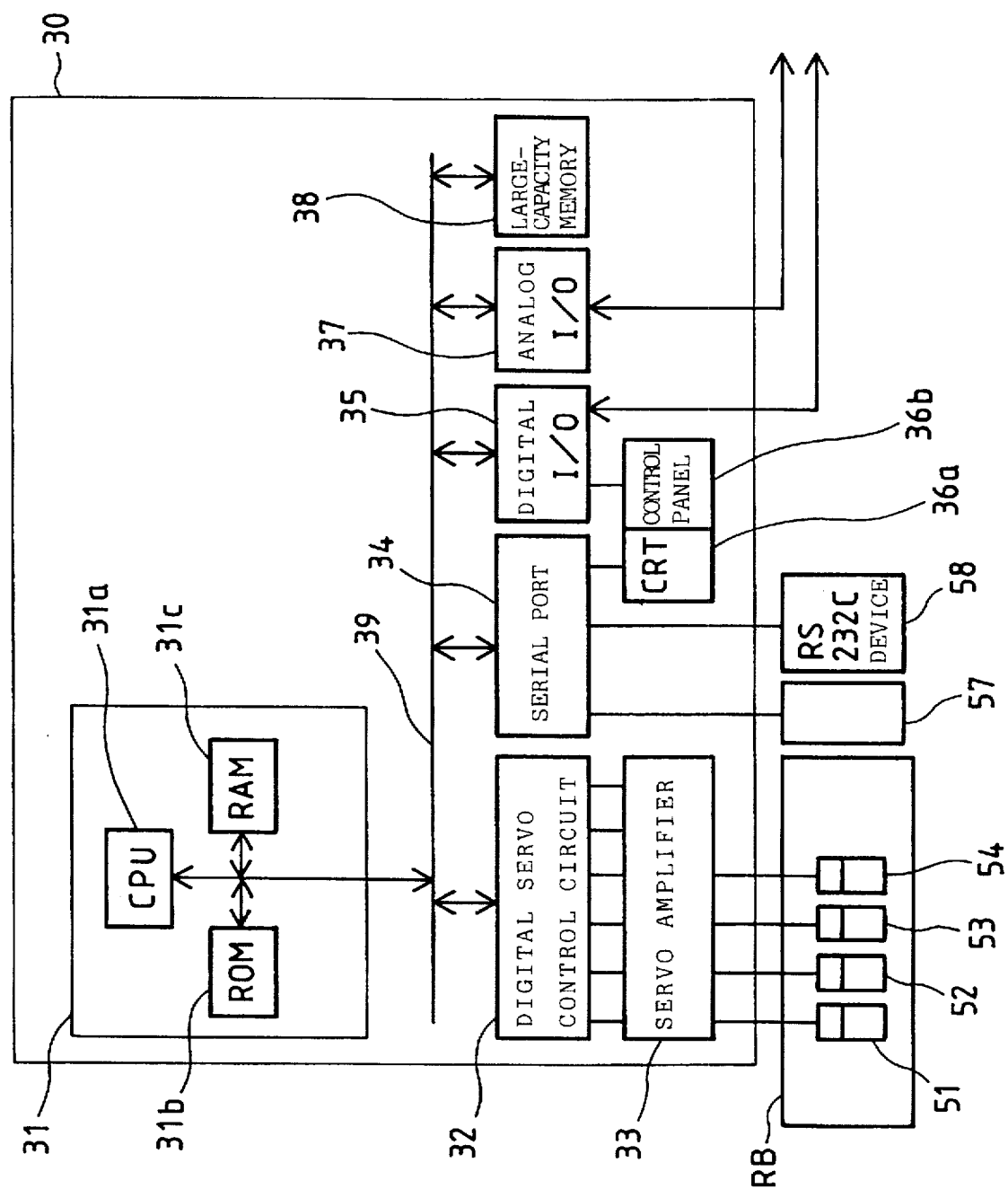
FIG. 2 is a block diagram showing the principal part of a typical arrangement of a robot control apparatus used to carry out time constant setting according to the present embodiment in an on-line mode.

The setting of the time constant based on the aforementioned calculations is carried out in an on-line mode. FIG. 2 is a block diagram showing the principal part of a typical arrangement of a robot control apparatus used for this purpose.

In FIG. 2, the robot control apparatus designated by numeral 30 is provided with a processor board 31. The processor board 31 is provided with a central processing unit (hereinafter referred to as CPU) 31a, consisting of a microprocessor, a ROM 31b, and a RAM 31c.

The CPU 31a controls the whole robot control apparatus in accordance with system programs stored in the ROM 31b. A considerable portion of the RAM 31c constitutes a nonvolatile memory region, and is loaded with various data for the calculations of the aforesaid equations [18] and [20] and the like, as well as operation programs and relevant set values. These data include structural parameters for calculating Jacobian matrixes and static load torques Twi, interference torque coefficients Ci based on the accelerations of the individual axes, inertias Ii, data for determining the coefficients A2 and A3 in equations [14A] and [14B], etc. The RAM 31c is partially used to temporarily store data for computational processings and the like to be executed by the CPU 31a.

The processor board 31 is coupled to a bus 39, and commands and data are transmitted to or received from other sections in the robot control apparatus through the bus coupling. A digital servo control circuit 32, which is connected to the processor board 31, receives commands from the CPU 31a and drives servomotors 51 to 56 through a servo amplifier 33. The servomotors 51 to 54 are contained in the robot RB, and are used to actuate the axes.

A serial port 34 is coupled to the bus 39, and is also connected to an teaching control panel 57 with a liquid crystal display unit, an RS232C device (interface for communication), and a CRT 36a. The teaching control panel 57 is used to input programs, such as taught programs, taught data, and other necessary set values. Besides, the connections the bus 39 is coupled to an input/output unit (digital I/O) 35 for digital signals, an input/output unit (analog I/O) 37 for analog signals, and a large-capacity memory 38.

The digital I/O 35 is connected to a control panel 36b through which operating conditions can be set or modified with reference to the screen of the CRT 36a. The large-capacity memory 38 is loaded with taught data, position data, various set values, operation programs, etc.

The programs for executing acceleration and deceleration control in consideration of interference torque and the data which represent torque curves are also stored, when not in use, in this large-capacity memory 38. Thus, the system can be arranged so that when the system is to be booted, starting programs in the ROM 31b are activated and suitably downloaded, together with required relevant data, into the RAM 31c in the processor board 31.

Figure 3:
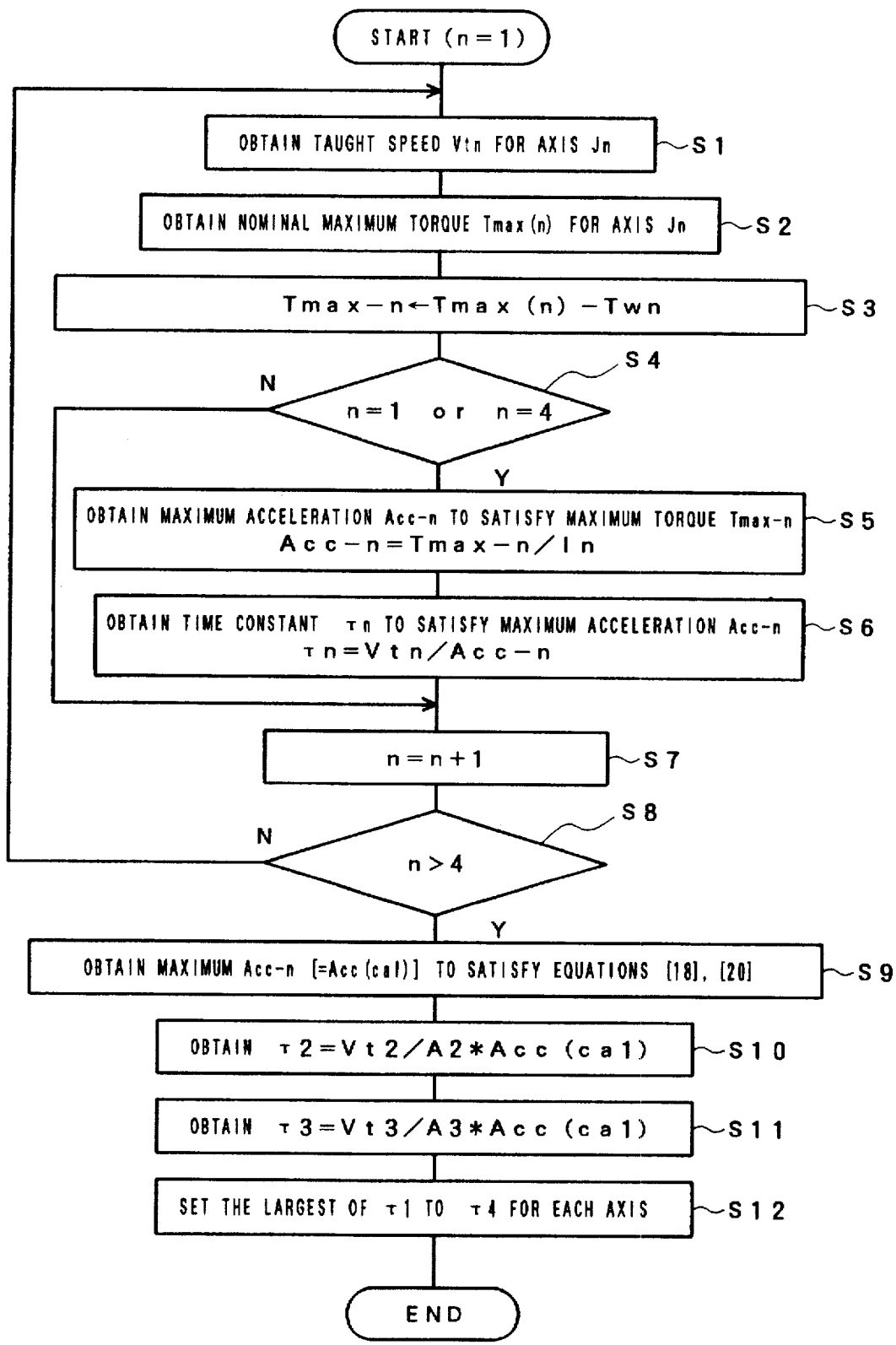
FIG. 3 is a flowchart illustrating an outline of processing for the time constant setting according to the present embodiment.

Referring now to the flowchart of FIG. 3, an outline of processing contents will be described for each processing step to explain processes for executing the time constant setting method according to the present embodiment, on the bases of the configuration and functions of the aforementioned robot control apparatus 30 and the storage conditions of the programs, data, etc. Here, the target motion section is assumed to be a long motion stroke. The following description will be made as to a case in which acceleration and deceleration control is based on time constants common to all of the first to fourth axes.

First, processing is started with an axis number index n initialized at 1. In Step S1, a taught speed Vtn for the axis Jn is obtained from the distance of movement of the axis to a target transfer position in the movement block concerned, in accordance with taught program data.

In Step S2, thereafter, a nominal maximum torque Tmax (n) corresponding to the taught speed Vtn is obtained in accordance with torque curve data (data indicating of the dependence of the maximum torque Tmax on the speed of the target servomotor) for the axis concerned. The nominal maximum torque Tmax(n) thus obtained includes a static load torque Twn.

In Step S3, thereafter, the static load torque Twn is subtracted from the maximum torque Tmax(n) for the axis concerned to obtain a (net) maximum torque Tmax–n.

For the axes (n=1 and n=4 according to the present embodiment) that are not based on the interference torques, an acceleration Acc–n for the maximum torque Tmax–n is obtained as follows (Steps S4 and S5):

$$Acc{-}n = Tmax{-}n/In.$$

A time constant τn in this case is obtained as follows (Step S6):

$$\tau n = Vtn/Acc{-}n.$$

After these processes are repeated four times with the axis number index counted up one by one (Step S7 and S8), the maximum Acc to satisfy equations [18] and [20] is calculated. The obtained Acc is given as Acc(cal) (Step S9).

Then, τ2 and τ3 are calculated as follows (Steps S10 and S11):

$$\tau 2 = Vt2/A2 * Acc(cal),$$

$$\tau 3 = Vt3/A3 * Acc(cal),$$

The calculated values τn (n=1, 2, 3, 4) are compared, and the largest one of these values is set as the time constant τ for each axis (Step S12).

In this manner, the setting of the time constant common to all the axes is completed.

In moving the robot in an axis-by-axis movement mode (in which the track of the movement to the target position is allowed to be deviated from an taught track), the time constant common to all the axes need not be assigned, though it is necessary to determine a time constant for each axis based on the interference torques as required.

According to the embodiment described above, only the interference torques between the specific axes (interference torques between second and third axes) are taken into consideration, it is to be understood that the interference torques among a plurality of axes or among all the axes may be taken into account. Under the condition that the time constant is to be determined for all the axes (conforming to the instruction track), if the time constant is determined in consideration of the interference torques between those axes which are most influenced by the interference torques, such time constant can be expected to be one that will not cause saturation of torques or inadequate performance among the rest of axes. Preferably, therefore, the axes between which the time constant based on the interference torques is calculated should be determined depending on individual cases.

Although the four-axis horizontal multi-joint robot is supposed as the robot according to the present embodiment, it will be apparent from the above description that the technical idea of the present invention can be applied to robots of any other types.

We claim:

1. A time constant setting method for a track program for a robot having a plurality of axes driven individually by servomotors, comprising steps of:

obtaining time constants for acceleration and deceleration control for at least two axes out of said plurality of axes, the time constants for acceleration and deceleration being obtained to be the shortest time constants as far as torques generated to move the respective axes will not saturate, the time constants being obtained for the start point and end point of a motion where the speed at the respective axes can be regarded as zero, the time constants being obtained by taking into consideration the effects of interference torques exerted between said at least two axes, by on-line software processing of a robot controller which controls said robot; and setting the time constants obtained for said at least two axes, the time constant being set in the robot controller which controls said robot.

2. A time constant setting method for a track program for a robot according to claim 1, wherein said software processing includes processing for evaluating kinetic equations for the robot, said software processing includes processing for determining the interference torques between the at least two axes, according to the kinetic equations for the robot, and said software processing includes processing for obtaining the time constants by simultaneously satisfying restrictive conditions of the individual axes for actualizing a target track and restrictive conditions based on the maximum torque of the robot, the restrictive conditions being simultaneously satisfied based on an evaluation of the influences of the interference torques determined according to the kinetic equations for the robot.

3. A time constant setting method for a track program for a robot having a plurality of axes driven individually by servomotors, comprising steps of:

obtaining time constants for acceleration and deceleration control for at least two axes out of said plurality of axes, the time constants for acceleration and deceleration being obtained to be the shortest time constants as far as torques generated to move the respective axes will not saturate, the time constants being obtained for the start point and end point of a motion where the speed at the respective axes can be regarded as zero, the time constants being obtained by taking into consideration the effects of interference torques exerted between said at least two axes, by on-line software processing of a robot controller which controls said robot; and for each of the at least two axes, setting the longest time constant out of the obtained time constants for acceleration and deceleration the time constant being set in the robot controller which controls said robot.

4. A time constant setting method for a track program for a robot according to claim 3, wherein said time constants for acceleration and deceleration are obtained only for axes presupposed to be most influenced by the interference torques exerted therebetween.

* * * * *